(12) United States Patent
Mueller et al.

(10) Patent No.: US 10,808,763 B2
(45) Date of Patent: Oct. 20, 2020

(54) DEVICE FOR RETAINING OF LUBRICANTS IN ROLLING-ELEMENT BEARINGS, ROLLING-ELEMENT BEARING SUBASSEMBLIES, AND METHOD FOR ASSEMBLING A ROLLING-ELEMENT BEARING SUBASSEMBLY

(71) Applicant: Aktiebolaget SKF, Gothenburg (SE)

(72) Inventors: Thomas Mueller, Werneck (DE); Joerg Assmann, Schweinfurt (DE); Johannes Ruopp, Oerlenbach (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/554,740

(22) PCT Filed: Mar. 11, 2016

(86) PCT No.: PCT/EP2016/055211
§ 371 (c)(1),
(2) Date: Aug. 31, 2017

(87) PCT Pub. No.: WO2016/142499
PCT Pub. Date: Sep. 15, 2016

(65) Prior Publication Data
US 2018/0017109 A1 Jan. 18, 2018

(30) Foreign Application Priority Data

Mar. 12, 2015 (DE) .................. 10 2015 204 432

(51) Int. Cl.
*F16C 33/66* (2006.01)
*F16C 35/06* (2006.01)
*F16C 41/04* (2006.01)

(52) U.S. Cl.
CPC ...... *F16C 33/6651* (2013.01); *F16C 33/6607* (2013.01); *F16C 41/04* (2013.01); *F16C 35/061* (2013.01)

(58) Field of Classification Search
CPC ............. F16C 33/6607; F16C 33/6614; F16C 33/664; F16C 33/6651; F16C 35/061
See application file for complete search history.

(56) References Cited

U.S. PATENT DOCUMENTS 9,850,952 B2 * 12/2017 Holsnijders ......... F16C 33/6622
9,933,016 B2 * 4/2018 Shishihara .............. F16C 35/06
(Continued)

FOREIGN PATENT DOCUMENTS

CN       101263311 A    9/2008
DE       4336075 A1     4/1995
(Continued)

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A rolling-element bearing subassembly includes a first bearing ring having an axial face lying in a plane and a plurality of rolling elements on a running surface of the first bearing ring. The first bearing ring is connectable to a second bearing ring to form a rolling-element bearing. An annular retaining body having a first leg connected to a second leg by a bridge, the first leg being shorter than the second leg, is mounted on an axial face of the first bearing ring with the first leg contacting the axial face so that the bridge is located on a first side of the plane and the second leg extends through the plane to define an annular gap between a portion of the first bearing ring and the bridge and a portion of the second leg for retaining a lubricant.

4 Claims, 2 Drawing Sheets

(56) References Cited

U.S. PATENT DOCUMENTS

| | | | | |
|---|---|---|---|---|
| 2011/0206306 A1* | 8/2011 | Urano | ............... | F16J 15/162 |
| | | | | 384/473 |
| 2012/0027332 A1* | 2/2012 | Sone | .................. | F16C 33/62 |
| | | | | 384/477 |
| 2014/0363114 A1* | 12/2014 | Katsaros | ............ | F16C 33/6648 |
| | | | | 384/469 |

FOREIGN PATENT DOCUMENTS

| | | |
|---|---|---|
| DE | 102010045319 A1 | 3/2012 |
| DE | 102011076103 A1 | 11/2012 |
| DE | 102013210522 A1 | 12/2014 |
| DE | 212013000161 U1 | 3/2015 |
| EP | 1905614 A1 | 4/2008 |
| EP | 2792894 A1 | 10/2014 |
| JP | 2007333016 A | 12/2007 |
| WO | 2014054996 A1 | 4/2014 |
| WO | 2015000509 A1 | 1/2015 |

* cited by examiner

DEVICE FOR RETAINING OF LUBRICANTS IN ROLLING-ELEMENT BEARINGS, ROLLING-ELEMENT BEARING SUBASSEMBLIES, AND METHOD FOR ASSEMBLING A ROLLING-ELEMENT BEARING SUBASSEMBLY

CROSS-REFERENCE

This application is the U.S. National Stage of International Application No. PCT/EP2016/055211 filed on Mar. 11, 2016, which claims priority to German patent application no. 10 2015 204 432.7 filed on Mar. 12, 2015.

TECHNOLOGICAL FIELD

The invention relates to a device for retaining of lubricants in rolling-element bearings, in particular in radial rolling-element bearings, a rolling-element bearing subassembly, in particular of a radial rolling-element bearing, including such a device, as well as a method for assembly of such a rolling-element bearing subassembly.

BACKGROUND

Radial and axial rolling-element bearings serve for the rotatable supporting of two objects with respect to each other. Rolling-element bearings include at least two bearing rings that are disposable on each one of the objects to be supported and rotatable with respect to each other about a common axis. In order to make possible a frictionless-as-possible sliding against each other of the bearing rings, rolling elements are disposed between the bearing rings, which rolling elements roll or roll on race surfaces of the bearing rings. In radial rolling-element bearings a bearing ring that is disposed with its inner surface on an object to be supported is referred to as inner ring, and a bearing ring that is disposed with its outer surface on an object to be supported as outer ring. The inner ring accordingly at least essentially has a smaller diameter than the outer ring.

For reducing a rolling resistance of rolling-element bearings, linear guides, or ball screws, for ensuring a quiet and uniform as possible running, for reduction of operating temperatures, and for achieving a low wear, the rolling elements and the race surfaces have a smooth- and uniform-as-possible surface and are manufactured from a hard, low-wear, preferably corrosion-resistant material. Furthermore, rolling-element bearings, linear guides, and ball screws have a lubrication, e.g., a grease- or oil-lubrication, in order to further reduce the rolling resistance.

For storing, transporting, and/or installing, rolling-element bearings are often not provided in a completely assembled state but as separate subassemblies. This has the advantage that the individual subassemblies have smaller dimensions as well as a lower weight than the complete rolling-element bearing, and thus are more easily storable, transportable, and installable at an installation location. With radial rolling-element bearings, bearing outer ring and bearing inner ring are therefore provided as separate subassemblies, wherein the rolling elements are often disposed on the subassembly of the bearing outer ring. In this way the rolling elements are better protected from external influences, in particular mechanical effects.

Rolling-element bearings, in particular radial rolling-element bearings, provided in this manner as assemblable subassemblies have the disadvantage that a bearing lubricant, such as, for example, bearing oil or bearing grease that is disposed surrounding the rolling elements on the inside of an outer ring or outside of an inner ring, can escape from the rolling-element bearing, since no corresponding inner ring or outer ring is disposed against the rolling elements for the retaining of the lubricant. This can lead to contamination of the environment and often requires a complex relubricating of the rolling-element bearing before or during the installing of the rolling-element bearing. An installation process of the rolling-element bearing is thereby more complex as well as more time- and cost-intensive.

Furthermore, it is known to transport completely assembled multi-row rolling-element bearings horizontally, since a horizontal transport, in particular with particularly large rolling-element bearings, is particularly secure, and the rolling-element bearings are easier to handle horizontally. During horizontal transport the problem often arises with multi-row rolling-element bearings that due to the influence of gravity and/or temperature and/or vibrations, bearing grease arrives from one rolling-element row into another rolling-element row. In particular in a running-in phase of the rolling-element bearing such a grease displacement can lead to complications, such as, for example, increased friction, temperature peaks, increased internal bearing pressure, and/or grease escape.

SUMMARY

The object of the present invention is therefore to provide a device for the retaining of lubricants in rolling-element bearings, in particular radial rolling-element bearings, that at least partially does not have the above disadvantages. Furthermore it is the object to provide a rolling-element bearing subassembly, in particular of a radial rolling-element bearing, that at least partially does not have the above disadvantages. Finally it is the object to provide a method for assembly of a rolling-element bearing subassembly, in particular of a radial rolling-element bearing, that at least partially does not have the above disadvantages.

Accordingly the object of the present invention is achieved by a device for the retaining of lubricants in rolling-element bearings, in particular in radial rolling-element bearings, including an annular or essentially annular retaining body. The retaining body is disposable on a rolling-element bearing subassembly, which includes a bearing ring configured as outer ring or inner ring as well as a rolling-element set, such that a lubricant space of the device is delimited on at least two sides by the retaining body and the bearing ring of the rolling-element bearing subassembly.

The retaining body is configured so as to retain a bearing lubricant, in particular bearing grease. Accordingly the device, or at least the retaining body, preferably includes a lubricant-resistant or an essentially lubricant-resistant material. Preferably the device includes a lubricant space for receiving of a lubricant, in particular bearing grease. The lubricant space is preferably open toward at least one side. The device is preferably configured such that in the installed state the open side of the lubricant space is facing the rolling-element set. Such a lubricant space has the advantage that a rolling-element bearing is impingeable with a lubricant in a simple as well as cost-effective manner by disposing of the device on a bearing ring.

The retaining body is disposable on the bearing ring such that the retaining body at least partially overlaps the bearing ring in the axial direction. With a bearing ring configured as outer ring the retaining body is thus disposable at least partially in the radial direction inside the outer ring; with a bearing ring configured as inner ring the retaining body is thus disposable at least partially in the radial direction outside the inner ring. The device is thus disposable on a bearing ring such that in the assembled state the retaining body is facing the other bearing ring.

A rolling-element set includes a plurality of rolling elements that are preferably disposed on or in a rolling-element cage. The rolling-element cage ensures a predefined spacing of adjacent rolling elements with respect to one another. Moreover, using a rolling-element cage it is preventable that rolling elements fall out from a rolling-element bearing subassembly on which no inner ring or outer ring is disposed. With multi-row rolling-element bearings the rolling-element sets are also referred to as rolling-element rows.

Compared to the prior art such a device offers the advantage that a lubricant, in particular bearing grease, is retainable by the retaining body in a lubricant space between the retaining body and the one bearing ring that is configured as outer ring or inner ring. Thus the bearing grease remains in the lubricant space without a further bearing ring that is correspondingly configured as inner ring or outer ring being disposed on the rolling-element bearing. The risk that lubricant escapes from a rolling-element bearing subassembly is thereby significantly reduced. A relubricating of the rolling-element bearing is thus not required. Furthermore, the penetrating of foreign bodies, such as, for example, dust- or dirt-particles, into the rolling-element bearing subassembly is significantly reduced. With completely assembled multi-row bearings the device has the advantage that a grease exchange between the bearing rows is preventable or at least greatly restrictable. This is advantageous in particular for a transport of horizontal rolling-element bearings, since a grease exchange between the bearing rows is encouraged by a horizontal transport, in particular by an interplay of gravity, temperature, and vibrations.

According to one preferred further development the device includes a bridge including a first end and a second end, wherein the first end of the bridge is disposed on the retaining body. The bridge extends from the first end in the radial direction or essentially in the radial direction of the retaining body. In the width direction of the retaining body the bridge is disposed thereon at an arbitrary position. The bridge is preferably disposed centrally or essentially centrally on the retaining body. Thus the bridge separates a region formed on the retaining body into two approximately equal-sized regions. This is advantageous in particular for the use in multi-row rolling-element bearings when the device is disposed between two rolling-element sets. A transfer of bearing lubricant of adjacent rolling-element sets is thereby preventable in an advantageous manner In one alternative embodiment the bridge is disposed on an edge of the retaining body. This alternative embodiment is particularly suited for single row rolling-element bearings wherein in the installed state the bridge is facing the rolling-element set. A lubricant escape from a rolling-element bearing subassembly is thereby preventable in the axial direction in an advantageous manner.

Preferably the device includes an annular or essentially annular holding body that is disposed on the second end of the bridge that is facing away from the retaining body. The device is thus disposable on a bearing ring such that the holding ring is disposed adjacent to the bearing ring. Such a holding ring increases the stability of the device and improves a disposability as well as a holding of the device on the bearing ring. Furthermore, retaining body, bridge, and holding body form a lubricant space for receiving of a bearing lubricant. This lubricant space is preferably expandable by a bearing ring when the device is disposed on the bearing ring. Thus in the installed state of the device a preventing of the escape of bearing lubricant is further improved. Preferably, the holding body can be clamped between two bearing rings such that the device is held between the bearing rings.

Further preferably the holding body has a width that is smaller than a width of the retaining body. The retaining body preferably has a width that is adjacent to the retaining body in the installed state of the rolling elements of the rolling-element set such that a retaining of lubricant is ensured. Preferably the device is configured such that in the installed state the retaining body does not contact the rolling elements. This is advantageous in particular with devices that are configured for installation on multi-row rolling-element bearings.

In one advantageous design of the device the retaining body is disposed centrally with respect to the retaining body in the axial direction of the device. This arrangement is advantageous in particular with devices that are configured for installation on multi-row rolling-element bearings, since the device is thus disposable centrally or essentially centrally between two rolling-element rows.

Preferably the device or the retaining body is at least partially formed from a lubricant that is configured for the retaining of the lubricant of a rolling-element bearing. The lubricant is preferably configured solid, or essentially solid, at room temperature. It is also preferred that the lubricant is liquefiable by one-time activating at a temperature above room temperature. This has the advantage that at least one part of the device is usable as replacement lubricant in operation of the device.

Moreover, the object is achieved by a rolling-element bearing subassembly including a bearing ring and a plurality of rolling elements that are disposed on a race surface of the bearing ring. A device according to one of claims 1 to 6 is disposed such that a lubricant space is formed between bearing ring and device, wherein a retaining body of the device is disposed adjacent to the rolling elements. The rolling elements are preferably disposed in a rolling-element cage. The bearing ring is further preferably configured as an outer ring. The device is preferably disposed at least partially inside the outer ring. Such a rolling-element bearing subassembly has the advantage that an escape of bearing lubricant is prevented by bearing ring and device. Thus the rolling-element bearing subassembly is easily storable, transportable, as well as installable at an installation location together with a further bearing ring without a relubricating of the rolling-element bearing subassembly or of the rolling-element bearing being required.

In one advantageous design the device for retaining of lubricants is disposed on the bearing such that with an assembling of the rolling-element bearing subassembly with a bearing ring disposable on the rolling-element bearing subassembly, the device can remain on the bearing ring. The bearing ring of the rolling-element bearing subassembly is preferably configured as an outer ring, and thus the bearing ring disposable on the rolling-element bearing subassembly as an inner ring. An attachment of the inner ring onto the rolling-element bearing subassembly is not hindered by the device for retaining of lubricant. This has the advantage that a retaining of the lubricant is ensured even during assembly.

Particularly advantageously the rolling-element bearing is a multi-row rolling-element bearing. Further preferably a device for retaining of lubricants is disposed at least between two rolling-element sets of the rolling-element bearing.

Furthermore, the object is achieved by a method for assembling a rolling-element bearing subassembly, including the steps:

provided a bearing ring of a rolling-element bearing;

disposing at least one rolling-element set on the bearing ring;

disposing a device according to the disclosure on the bearing ring such that a lubricant space for a bearing lubricant is formed between the bearing ring and the device; and filling the lubricant space with a bearing lubricant.

Preferably prior to the disposing of the device on the bearing ring the bearing lubricant is already disposed on the device such that after the disposing of the device on the bearing ring the bearing lubricant is disposed in the lubricant space. The bearing ring is preferably configured as an outer ring; using the method a rolling-element bearing subassembly including a bearing ring is providable that ensures a retaining of the bearing lubricant.

In the following the invention shall be explained in more detail with reference to an illustration.

DETAILED DESCRIPTION

Figure 1:
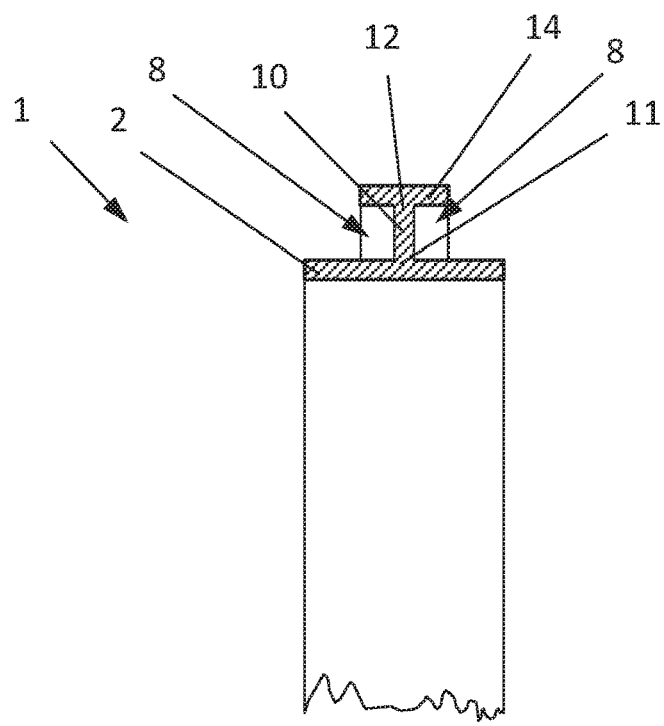
FIG. 1 schematically shows a side view of a first embodiment of a device for the retaining of lubricants.

The first embodiment shown in FIG. 1 of a device 1 for retaining of lubricants includes a retaining body 2 that is configured annular. A bridge 10 is formed in a center of an outside of the retaining body 2. A first end 11 of the bridge 10 is disposed on the retaining body 2. The bridge 10 extends radially outward from the retaining body 2. An annular holding body 14 is disposed on a second end 12 of the bridge. Between retaining body 2, bridge 10, and holding body 14, lubricant spaces 8 are formed on both sides of bridge 10 for the receiving of bearing lubricant, in particular bearing grease. This first embodiment of the device 1 is suited in particular for multi-row rolling-element bearing subassemblies 3 (see FIG. 3) that include an outer ring 4. The inner ring 5 further comprises a holding ring 31 abuttingly positioned thereon (see FIG. 3).

Figure 2:
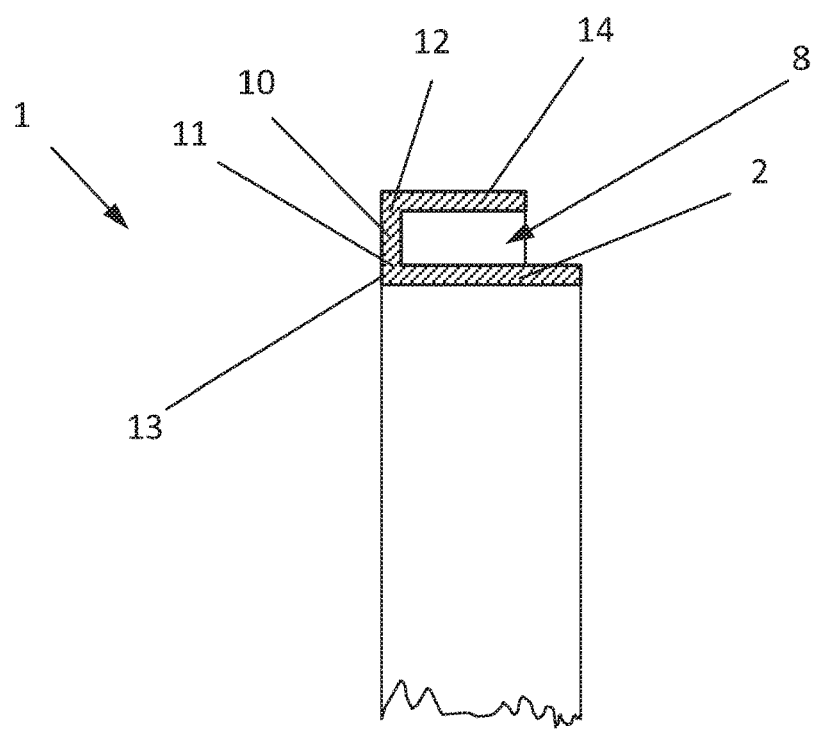
FIG. 2 schematically shows a side view of a second embodiment of a device for the retaining of lubricants.

The second embodiment shown in FIG. 2 of a device 1 for retaining of lubricants includes a retaining body 2 that is configured annular. A bridge 10 is formed on one edge 13 of the retaining body 2. A first end 11 of the bridge 10 is disposed on the retaining body 2. The bridge 10 extends radially outward from the retaining body 2. An annular retaining body 14 is disposed on a second end 12 of the bridge. On one side of bridge 10 a lubricant space 8 is formed between retaining body 2, bridge 10, and holding body 14 for the receiving of bearing lubricant, in particular bearing grease. This second embodiment of the device 1 is suited in particular for single row rolling-element bearing subassemblies 3 that include an outer ring 4.

Figure 3:
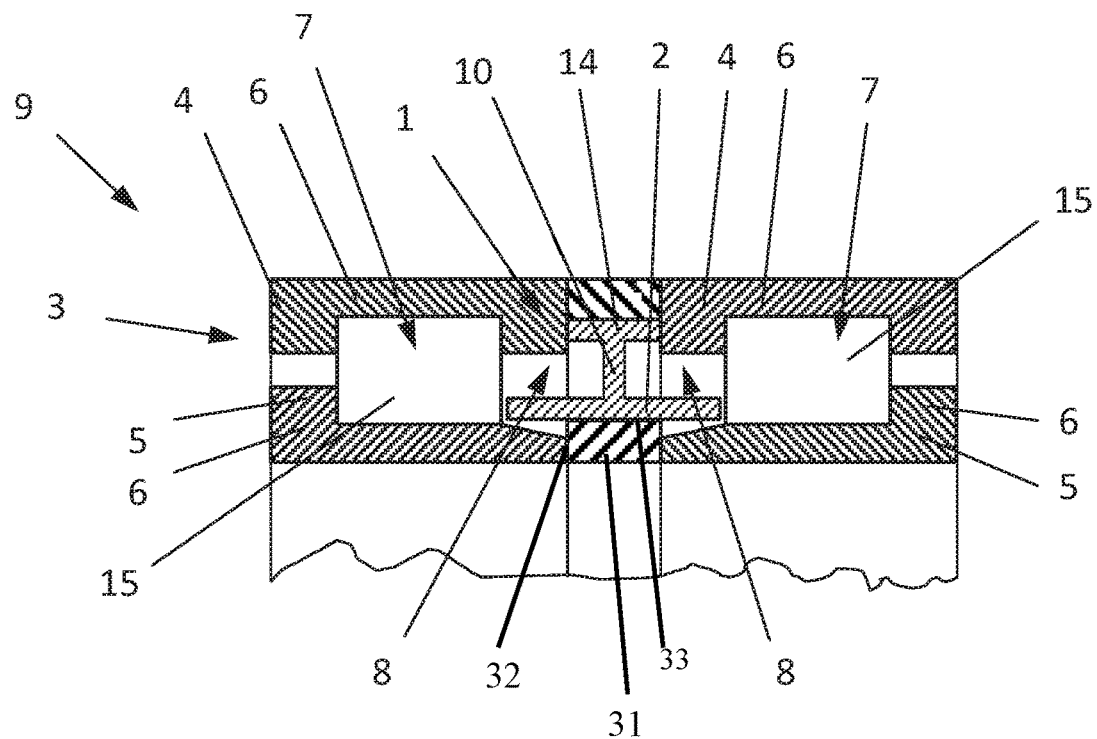
FIG. 3 shows a side view of a double-row rolling-element bearing including the first embodiment of the device.

FIG. 3 shows a double-row rolling-element bearing 9 including two rolling-element sets 7, wherein a first embodiment of the device 1 is disposed between the rolling-element sets 7. The rolling-element bearing 9 includes four bearing rings 6, of which two are configured as outer rings 4 and two as inner rings 5. A holding body 14 of the device 1 is disposed between the two outer rings 4 and preferably clamped between them. The holding body 14 of the device 1 is also abuttingly disposed against the radially outer surface 33 of the holding ring 31. The holding ring 31 axially abuts axial end 32 of the inner bearing ring 5 such that the holding body 14 of the device 1 and the holding ring 31 prevent lubricant from leaking therethrough. On both sides of bridge 10 lubricant spaces 8 are formed between the device 1 and the outer rings 4 for the receiving of bearing lubricant, in particular bearing grease. Thus even with removal of the bearing inner rings 5 it is ensured by the device 1 that bearing lubricant flows out from the rolling-element bearing 9. Furthermore an exchange of bearing lubricant between the two rolling-element sets is prevented by the device 1.

Figure 4:
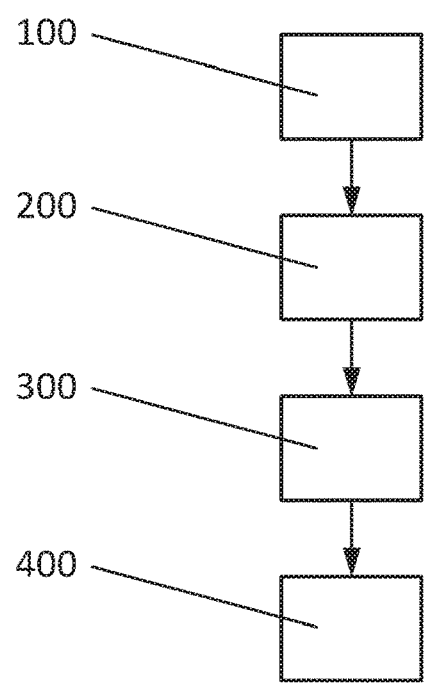
FIG. 4 shows a flow diagram of a method for assembling a rolling-element bearing subassembly.

In FIG. 4 a method for assembling a rolling-element bearing subassembly 3 is depicted in a flow diagram. In a first method step 100 a bearing ring 6 of a rolling-element bearing 9, preferably an outer ring 4, is provided. In a second method step 200 at least one rolling element set 7 is disposed on a running surface of the bearing ring 6. In a third method step 300 a device 1 for retaining of bearing lubricant is disposed on the bearing ring 6 such that a lubricant space 8 for a bearing lubricant is formed between the bearing ring 6 and the device 1. In a fourth method step 400 the lubricant space 8 for lubricating the rolling-element bearing subassembly 3 is filled with a bearing lubricant. Alternatively the fourth method step 400 is carried out prior to the third method step 300 or already prior to the second method step 200. In this alternative method the bearing lubricant is preferably introduced in the lubricant space 8 or in the lubricant spaces 8 of the device 1 that are formed between the retaining body 2, the bridge 10, and the retaining body 14. The sequence of method steps is changeable at the discretion of the person skilled in the art without thereby leaving the scope of the invention.

REFERENCE NUMBER LIST

1 Device
2 Retaining body
3 Rolling-element bearing subassembly
4 Outer ring
5 Inner ring
6 Bearing ring
7 Rolling-element set
8 Lubricant space
9 Rolling-element bearing
10 Bridge
11 First end
12 Second end
13 Edge
14 Holding body
15 Rolling element
31 Holding Ring
32 Axial end
33 Radially outer surface
100 First method step
200 Second method step
300 Third method step
400 Fourth method step

The invention claimed is:

1. A rolling-element bearing subassembly including:
a first bearing ring and a plurality of rolling elements that are disposed on a running surface of the first bearing ring, the first bearing ring having an axial end defining a plane,
a device for retaining a lubricant abuttingly disposed against the axial end of the first bearing,
a second bearing ring, the plurality of rolling elements being disposed in a chamber partially delimited by the first bearing ring and the second bearing ring,
a holding ring disposed against an axial end of the second bearing ring, the holding ring defining a radial surface facing the chamber, wherein the device also abuts the radial surface of the holding ring,
the device comprising an annular retaining body comprising a first leg connected to a second leg by a bridge, the first leg being shorter than the second leg, the first leg of the annular retaining body being mounted on the axial end of the first bearing ring, the bridge being located on a first side of the plane, and the second leg extending axially from the bridge through the plane and toward the plurality of rolling elements to form an annular gap delimited by a portion of the first bearing ring and by the bridge and by a portion of the second leg, the gap being configured to retain the lubricant, wherein the device is positioned in the rolling-element bearing subassembly such that the lubricant is prevented from leaving the chamber by flowing between the device and the first bearing ring and is prevented from leaving the chamber by flowing between the device and second bearing ring,
and wherein the bridge connects a center portion of the first leg to a center portion of the second leg.

2. A rolling-element bearing subassembly comprising:
a first bearing ring having an axial face lying in a plane and an opening in the axial face and a plurality of rolling elements disposed on a running surface of the first bearing ring, the first bearing ring being configured to be connected to a second bearing ring to form a rolling-element bearing, the subassembly not including the second bearing ring;
a holding ring contacting the axial face of the first bearing ring;
an annular retaining body comprising a first leg connected to a second leg by a bridge, the first leg being shorter than the second leg, the first leg of the annular retaining body being configured to be mounted on an axial face of the second bearing ring, the bridge being located on a first side of the plane, and the second leg extending axially from the bridge through the plane and toward the plurality of rolling elements to define an annular gap between a portion of the first bearing ring and the bridge and a portion of the second leg configured to retain a lubricant, wherein the annular retaining body is positioned in the rolling-element bearing subassembly such that the lubricant is prevented from leaving the chamber by flowing between the annular retaining body and the first bearing ring, the annular retaining body being located such that the second leg is positioned on the holding ring;
and wherein the bridge connects a center portion of the first leg to a center portion of the second leg.

3. A method comprising:
providing a first bearing ring having an axial end defining a plane, an opening in the axial end and a plurality of rolling elements disposed on a running surface of the first bearing ring;
attaching a second bearing ring to the first bearing ring to form a first bearing assembly, the plurality of rolling elements being disposed in a chamber partially delimited by the first bearing ring and the second bearing ring;
providing a holding ring such that the holding ring is positioned on an axial end of the second bearing ring;
applying lubricant to the plurality of rolling elements;
providing an annular retaining body comprising a first leg connected to a second leg by a bridge, the first leg being shorter than the second leg;
placing the first leg of the annular retaining body on the axial end of the first bearing ring such that the bridge is located on a first side of the plane and the second leg extends axially from the bridge through the plane and toward the plurality of rolling elements to define an annular gap between a portion of the first bearing ring and the bridge and a portion of the second leg to retain the lubricant, wherein the annular retaining body positioned in the first bearing assembly such that the lubricant is prevented from leaving the chamber by flowing between the annular retaining body and the first bearing ring and is prevented from leaving by flowing between the annular retaining body and the second bearing ring, wherein the device is positioned on the holding ring such that the annular retaining body and the holding ring combine to prevent lubricant from passing therethrough; and
wherein the bridge connects a center portion of the first leg to a center portion of the second leg.

4. The method according to claim 3 including:
providing a second bearing assembly;
placing the second bearing assembly on the first bearing assembly such that the first leg contacts a first bearing ring of the second bearing assembly and the second leg extends into an interior of the second bearing.

* * * * *